United States Patent [19]
Meredith

[11] Patent Number: 5,199,043
[45] Date of Patent: Mar. 30, 1993

[54] LINING FOR A DIRECT-CURRENT ELECTRIC ARC FURNACE

[75] Inventor: Dane Meredith, Brandon, Fla.

[73] Assignee: Deutsche Voest-Alpine Industrieanlagenbau GmbH, Dusseldorf, Fed. Rep. of Germany

[21] Appl. No.: 743,146

[22] Filed: Aug. 9, 1991

[51] Int. Cl.$^5$ .............................................. F27D 1/00
[52] U.S. Cl. ........................................ 373/72; 373/60; 373/65; 373/71; 373/75
[58] Field of Search ..................... 373/71, 72, 75, 85, 373/84, 135, 155, 157, 162, 164, 101, 103, 108, 60, 65

[56] References Cited

U.S. PATENT DOCUMENTS

| | | | |
|---|---|---|---|
| 4,277,638 | 7/1981 | Stenkvist | 373/72 |
| 4,334,029 | 6/1982 | Naito et al. | 501/109 |
| 4,336,411 | 6/1982 | Hanas et al. | 373/85 |
| 4,468,782 | 8/1984 | Stenkvist | 373/84 |
| 4,541,099 | 9/1985 | Rappinger et al. | 373/72 |
| 5,052,018 | 9/1991 | Meredith | 373/72 |

Primary Examiner—Bruce A. Reynolds
Assistant Examiner—Tu Hoang
Attorney, Agent, or Firm—Locke Reynolds

[57] ABSTRACT

A lining for a direct-current electric-arc furnace, in which at least part of that regions of said furnace which receives the melt is provided on the inside with an electrically conductive, refractory brick lining and a ring-shaped current conductor, on its outside, constitutes the opposite pole to the upper electrode centrally extending into said surface. The entire bottom area is covered with a refractory, insulating brick lining and a brick lining of graphite bricks is applied onto that brick lining in the radially outer wall region of the furnace. Located adjacent thereto in radially inward manner is an annular zone, comprising an electrically conductive, refractory brick lining. The central bottom area above said insulating brick lining is consittuted by a monolithic ramming mass. Furthermore, the material of the wall of said furnace above said brick lining of graphite bricks largely corresponds to that of said insulating brick lining at the hearth bottom.

9 Claims, 1 Drawing Sheet

LINING FOR A DIRECT-CURRENT ELECTRIC ARC FURNACE

BACKGROUND OF THE INVENTION

The invention relates to a lining for direct-current electric-arc furnace, and particularly for such a furnace having a top electrode centrally extending into said furnace, the second electrode comprising an electrically conductive, refractory brick lining provided on the inside of the furnace and a ring-shaped current conductor on its outside.

From European Printed Publication 0,422,406, a direct current electric-arc furnace has become known, in which the region receiving the melt comprises an electrically conductive, refractory brick lining. A cylindrical current conductor in the form of a copper ring is placed around this electrically conductive brick lining. Both the conductive brick lining and the copper ring together constitute the anode of said direct-current electric-arc furnace.

The brick lining consists of several layers. The layer which is in direct contact with the molten metal is formed of an electrically conductive, wear-resistant refractory material. For the purpose of smoothing the brick step, a layer of electrically conductive ramming mass is applied onto the layer serving as brick lining. This part of the brick lining is to consist e.g. of carbon magnesite.

A layer of graphite bricks which possess a much higher electrical conductivity is located beneath this layer. The thickness of the layer increases towards the outer edge and, there, corresponds to the level of the copper ring so that a favorable current conduction is ensured.

Adjacent to this layer is a layer of electrically insulating, refractory bricks which fills the entire bottom area of the furnace and ensures thermal insulation.

The electrical conductivity of the layer facing the molten bath and the agitation of the bath associated therewith cause a relatively uniform temperature distribution in the molten material. Due to the carbon content of the carbon magnesite bricks, inadvertent carburization of the molten steel may, however, occur when the melting steel has a deliberately low carbon content. If, furthermore, the layer facing the melt should be damaged due to mistakes during melting, e.g., insufficient heel or mechanical impacts from the charge or top electrode, so that the molten bath comes into direct contact with the graphite bricks, the letter may dissolve and the brick lining may be so heavily damaged that an extensive repair becomes necessary.

Considering the foregoing, it is an object of the invention to construct the hearth area of a direct-current electric-arc furnace in such a way that its resistance to wear is increased and the intrusion of carbon, especially from the central region of the hearth, into the melt is largely prevented.

SUMMARY OF THE INVENTION

According to the invention, the entire bottom area of the furnace is covered with a first lining of refractory, insulating brick. A second portion of graphite bricks is applied onto the first brick lining in a radially outer wall region of the furnace. A third region comprising electrically conductive, refractory brick is located adjacent the second in an annular zone, radially inward thereof. The central bottom area above the insulating brick lining is composed of a monolithic ramming mass, and the material of the wall of the furnace above the second portion of graphite bricks largely corresponds to that of the insulating brick lining at the hearth bottom.

Advantageously, the monolithic ramming mass predominately comprises magnesite. The second layer is preferably situated in direct contact with the ring-shaped current conductor on the outside of the furnace. Preferably the junction between the third lining forming the annular zone and the central bottom area of ramming mass is jagged, that is, interconnected in a multiply indented manner. Likewise the junction between the third lining forming the annular zone and the second lining on the radially outer wall region of the furnace is jagged. Preferably the central hearth area includes embedded lines for supplying inert gas or argon to stir and to homogenize the melt.

The central hearth region, which preferably occupies at least 20% of the overall furnace diameter, is composed of a monolithic ramming mass which consists predominantly of magnesite that, when heated by the melt, passes through a sintering process and produces in said region a mass which is highly resistant to wear, which is not electrically conductive, and moreover, which does not include any electrical conductors.

The electrically conductive, refractory brick lining and the annular portion of the brick lining, which consists of graphite bricks, now as before, together assure the flow of current between anode and melt and ensure a corresponding contact with the molten material, even when cold-starting.

By the sintering of the ramming mass consisting of magnesite and by the multiply indented transition with the electrically conductive, refractory brick lining which consists of carbon magnesite, penetration of steel, especially in the transition or junction between the two regions, is prevented.

If, despite the higher resistance to wear, repairs of the bottom should become necessary after all, replacing the ramming mass in the central bottom area is much less laborious than patching a corresponding brick lining of the prior art.

Stirring means, such as they are used for homogenizing the melt (e.g., with nitrogen or argon), may simply be embedded in the central hearth region, in the ramming mass. Advantageously, these means should likewise consist of non-conductive, refractory material. Introducing these homogenizing means into the center of the molten bath affects their effectiveness in most favorable manner.

The fact that the electrically conductive, refractory brick lining and the annular portion consisting of graphite bricks are interconnected with each other in their transition now as before ensures good current conduction.

The invention is hereinafter explained in more detail with reference to the embodiment shown in the accompanying figure illustrating the best mode of carrying out the invention as presently understood.

DESCRIPTION OF THE PREFERRED EMBODIMENT

Figure 1:
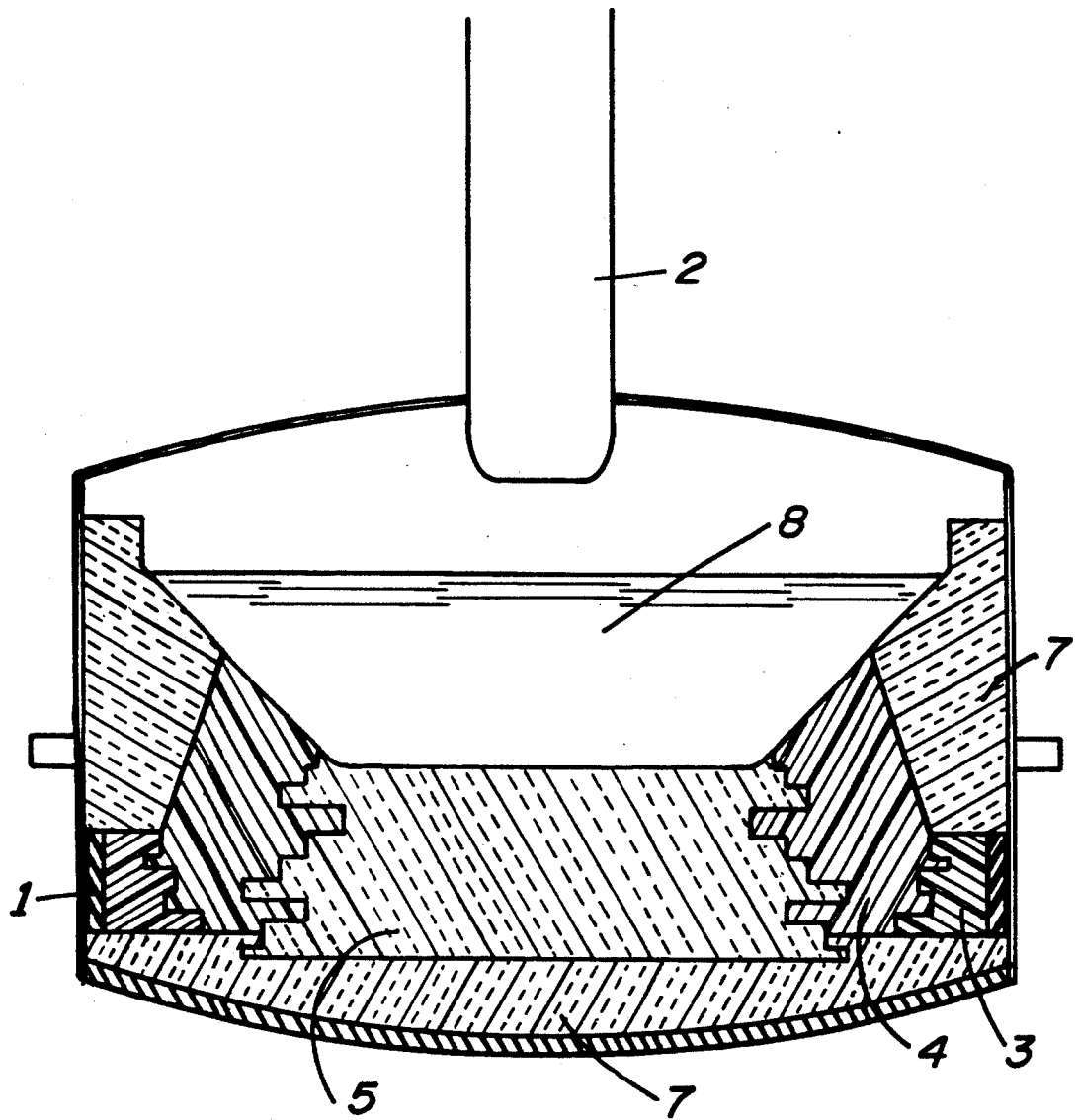
FIG. 1 shows a longitudinal section of the direct current electric-arc furnace according to the invention.

The illustrated electric-arc furnace has an annular current conductor 1 made of copper which constitutes part of the anode. The cathode 2 is located centrally above the melt 8. A refractory insulating brick lining 7 is provided above the bottom part which is preferably made of steel. Provided directly adjacent to the current conductor 1 designed as copper ring and in direct electrically conductive connection with the current conductor 1 is an annular portion 3 of the brick lining, the portion consisting of graphite bricks. Adjacent to the annual portion 3 of graphite bricks is another portion 4 of the brick lining, the portion 4 being made of electrically conductive, refractory material. Both regions 3 and 4 are interconnected with each other. The region 4 of the brick lining which is made of electrically conductive, refractory material is likewise designed in the form of a ring. This region 4 is preferably composed of carbon magnesite bricks.

A ramming mass 5, preferably principally consisting of magnesite, is introduced into the central region of the hearth which comes into direct contact with the melt 8. Due to the indented structure of the electrically conductive, refractory brick lining 4, as viewed in the direction of the central hearth region composed of the monolithig ramming mass 5, an intimate connection of both regions is achieved. Insulating bricks may possibly be additionally inserted here as transition which, because of their thermal behavior, even enhance the connection. In connection with the sintering of the magnesite used as ramming mass, penetration of steel in this critical transitional region is prevented.

According to a further variant, not illustrated, the lower, refractory, insulating brick lining 7 can be dispensed within the lower bottom area, and replaced by the monolithic ramming mass.

It is also possible to provide lines in the central hearth region, not shown in the figure, which are embedded in the ramming mass and through which e.g. nitrogen or argon for homogenizing the melt may be supplied. Also these lines should be made of non-conductive and refractory material.

With the simpler form of construction without those stirring means, there would be no danger in case of damage, i.e., when the hearth region is destroyed, since there are no additional means in the bottom region which are necessary for the operation of the furnace.

Given an external diameter of the furnace of 5.2 meters, the central hearth region 5 which is constituted by the monolithic ramming mass has a diameter with an extension of 2 meters. The latter diameter should, however, cover at least 20% of the overall external diameter of the furnace.

What is claimed:

1. A lining for a direct-current electric-arc furnace having a furnace bottom to receive a melt, a first electrode extending centrally into a top of the furnace, and a second electrode comprising a ring-shaped current conductor positioned outside and above the furnace bottom, the lining comprising:
   a first layer of refractory, insulating brick covering the furnace bottom, a second portion of graphite bricks applied onto the first layer in a radially outer wall region of the furnace, a third region comprising electrically conductive, refractory brick located adjacent the second portion in an annular zone, radially inward thereof, a central bottom area above said insulating brick lining composed of a monolithic ramming mass in direct physical contact with the melt, and a wall portion above said second portion of graphite bricks and adjacent to said electrically conductive refractory brick composed of insulating brick forming the lining at the furnace bottom.

2. A lining for an arc furnace configured to receive a melt, the arc furnace having ring shaped current conductor and an electrode extending into the arc furnace, with direct current passing between the ring shaped current conductor and the electrode, the lining comprising
   a refractory and electrically insulative brick lining,
   a plurality of graphite bricks annularly arranged to contact the ring shaped current conductor,
   a plurality of electrically conductive refractory bricks positioned to contact the graphite bricks and the electrically insulative brick lining, the electrically conductive refractory bricks being concentrically arranged radially inward from the graphite bricks,
   an electrically insulative monolithic ramming mass centrally positioned in direct physical contact with the melt and above the refractory and electrically insulative brick lining, the ramming mass accommodating the electrically conductive refractory bricks to define a jagged transition zone between the ramming mass and the electrically conductive refractory bricks, the transition zone also being defined by at least a portion of electrically conductive refractory and electrically insulative bricks.

3. The lining of claim 2, wherein the ramming mass consists essentially of magnesite.

4. The lining of claim 2, wherein the ramming mass occupies an area of at least about 20% of the arc furnace.

5. A lining for an arc furnace configured to receive a melt, the lining comprising:
   a current conductor positioned out of direct physical contact with the melt, and an electrode extendable into the arc furnace, with direct current passable between the current conductor and the electrode,
   a plurality of electrically conductive bricks positioned to provide electrical contact between the current conductor, the electrically conductive bricks comprising a plurality of graphite bricks arranged to contact the current conductor and a plurality of electrically conductive refractory bricks positioned to contact the graphite bricks and the melt, a refractory and electrically insulative brick lining covering the arc furnace, and
   an electrically insulative monolithic ramming mass centrally positioned in direct physical contact with the melt and above the refractory and electrically insulative brick lining, the ramming mass contacting the electrically conductive refractory bricks.

6. The lining of claim 5, wherein the ramming mass consists essentially of magnesite.

7. The lining of claim 5, wherein the ramming mass occupies an area of at least about 20% of the arc furnace.

8. The lining of claim 5, wherein the current conductor is ring shaped, the graphite bricks are arranged concentrically inside the ring shaped current conductor, the electrically conductive bricks are arranged concentrically inside the graphite blocks, and the ramming mass is centrally located in the arc furnace.

9. The lining of claim 5, wherein the graphite bricks are interleaved with the electrically conductive bricks to define a jagged transition zone.

* * * * *

UNITED STATES PATENT AND TRADEMARK OFFICE
CERTIFICATE OF CORRECTION

PATENT NO. : 5,199,043
DATED : March 30, 1993
INVENTOR(S) : Dane Meredith

It is certified that error appears in the above-identified patent and that said Letters Patent is hereby corrected as shown below:

In the Abstract, line 7, please delete "surface", and insert therefor --furnace--.

Signed and Sealed this

Twenty-second Day of March, 1994

Attest:

BRUCE LEHMAN

Attesting Officer        Commissioner of Patents and Trademarks